(12) United States Patent
Liu

(10) Patent No.: US 10,785,352 B2
(45) Date of Patent: Sep. 22, 2020

(54) FRONT CASE OF ELECTRONIC DEVICE, AND ELECTRONIC DEVICE

(71) Applicant: BEIJING XIAOMI MOBILE SOFTWARE CO., LTD., Beijing (CN)

(72) Inventor: Xinwei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/514,710

(22) Filed: Jul. 17, 2019

(65) Prior Publication Data

US 2020/0036821 A1    Jan. 30, 2020

(30) Foreign Application Priority Data

Jul. 27, 2018 (CN) .......................... 2018 1 0847691

(51) Int. Cl.
*H04M 1/02* (2006.01)
*G06F 1/16* (2006.01)
*H01Q 1/24* (2006.01)

(52) U.S. Cl.
CPC .......... *H04M 1/026* (2013.01); *G06F 1/1635* (2013.01); *G06F 1/1698* (2013.01); *H01Q 1/243* (2013.01);
(Continued)

(58) Field of Classification Search
CPC .. H04M 1/0202; H04M 1/0266; H04M 1/185; H04M 1/0268; H04M 1/02;
(Continued)

(56) References Cited

U.S. PATENT DOCUMENTS 9,218,020 B1   12/2015 Martinez et al.
2017/0005392 A1   1/2017 Hwang
(Continued)

FOREIGN PATENT DOCUMENTS

CN    106129616 A    11/2016
CN    205790355 U    12/2016
(Continued)

OTHER PUBLICATIONS

The extended European search report of European Patent Application No. 1918827.1, from the European Patent office, dated Dec. 17, 2019.

(Continued)

*Primary Examiner* — Diane D Mizrahi
(74) *Attorney, Agent, or Firm* — Syncoda LLC; Feng Ma

(57) ABSTRACT

A front case of an electronic device includes: a front case body, and a laser direct structuring laser direct structuring antenna stand as an auxiliary antenna of the electronic device. The front case body is provided with a through hole matching a shape of a feeding point of the laser direct structuring antenna stand; the laser direct structuring antenna stand is adhered to a front surface of the front case body by dispensing adhesive, and the feeding point of the laser direct structuring antenna stand extends through the through hole to a back surface of the front case body. The arrangement can reduce the difficulty and the cost of future rework of the touch panel, and can also reduce the risk of separation of the touch panel and the front case body.

20 Claims, 5 Drawing Sheets

(52) U.S. Cl.
CPC ......... *H04M 1/0249* (2013.01); *G06F 1/1626* (2013.01); *G06F 1/1643* (2013.01)

(58) Field of Classification Search
CPC .. H04M 1/026; H04M 1/0277; H04M 1/0283; G06F 1/16; G06F 1/1601; G06F 1/1626; G06F 1/1658; H01Q 1/243; H01Q 1/48
See application file for complete search history.

(56) References Cited

U.S. PATENT DOCUMENTS

| | | | |
|---|---|---|---|
| 2018/0076505 A1* | 3/2018 | Hu | H01Q 1/243 |
| 2018/0076507 A1 | 3/2018 | Heo | |
| 2018/0183137 A1* | 6/2018 | Tsai | H01Q 9/42 |

FOREIGN PATENT DOCUMENTS

| | | | |
|---|---|---|---|
| CN | 205863375 U | 1/2017 | |
| CN | 206271855 U | 6/2017 | |
| CN | 206611457 U | 11/2017 | |
| CN | 107742777 A | 2/2018 | |
| CN | 207183538 U | 4/2018 | |
| CN | 108075220 A | 5/2018 | |
| DE | 202008001548 U1 | 6/2008 | |
| WO | 2014068690 A1 | 5/2014 | |

OTHER PUBLICATIONS

The First Office Action of Chinese Patent Application No. 201810847691.7, from the CNIPA, dated Nov. 29, 2019.

\* cited by examiner

FRONT CASE OF ELECTRONIC DEVICE, AND ELECTRONIC DEVICE

CROSS-REFERENCE TO RELATED APPLICATION

The present application claims priority to Chinese patent application No. 201810847691.7 filed Jul. 27, 2018, the disclosure of which is hereby incorporated by reference in its entirety.

BACKGROUND

At present, a battery case for use with a smart device is typically provided in the form of a three-section battery case. That is, the battery case is divided into three sections, which are an upper section, a middle section and a lower section. The upper section and the lower section often serve as main antennas of the smart device. In contrast, the middle section then typically functions to isolate the upper section and the lower section to avoid interference.

SUMMARY

The present disclosure provides a front case of an electronic device, and an electronic device utilizing the front case.

According to a first aspect of the aspects of the present disclosure, there is provided a front case of an electronic device, including: a front case body, and a laser direct structuring (LDS) antenna stand as an auxiliary antenna of the electronic device, wherein the front case body is provided with a through hole matching a shape of a feeding point of the laser direct structuring antenna stand;

the laser direct structuring antenna stand is adhered to a front surface of the front case body by dispensing glue or adhesive, and the feeding point of the laser direct structuring antenna stand extends through the through hole to a back surface of the front case body.

In some embodiments, the flexible printed circuit board antenna can be replaced with a laser direct structuring antenna stand having a high structural strength as the auxiliary antenna of the electronic device, and the laser direct structuring antenna stand can be adhered to the front surface of the front case body by dispensing an adhesive or glue, thereby it can enhance the adhesion between the laser direct structuring antenna stand and the front case body. When the front case is applied on the electronic device, it can improve the adhesive strength between the touch panel and the front case body, reduce the difficulty and the cost of the rework of the touch panel, and reduce the risk of separation of the touch panel and the front case body.

According to a second aspect of the aspects of the present disclosure, there is provided an electronic device, including: a touch panel, a front case, and a main board, wherein the front case includes: a front case body, and a laser direct structuring laser direct structuring antenna stand as an auxiliary antenna of the electronic device, wherein the front case body is provided thereon a through hole matching a shape of a feeding point of the laser direct structuring antenna stand;

the laser direct structuring antenna stand is adhered to a front surface of the front case body by dispensing glue or adhesive, and the touch panel is adhered on the front surface of the front case body to which the laser direct structuring antenna stand is adhered; and the main board is provided with an antenna elastic piece connected to the feeding point of the laser direct structuring antenna stand, the main board is fixedly disposed on a back surface of the front case body, and the feeding point of the laser direct structuring antenna stand extends through the through hole to the back surface of the front case body to be in contact with the antenna elastic piece on the main board.

In some embodiments, the flexible printed circuit board antenna is replaced with a laser direct structuring antenna stand having a high structural strength as the auxiliary antenna of the electronic device, and the laser direct structuring antenna stand is adhered to the front surface of the front case body by dispensing glue or adhesive, thereby it can enhance the adhesion between the laser direct structuring antenna stand and the front case body, further improve the adhesive strength between the touch panel and the front case body, reduce the difficulty and the cost of the rework of the touch panel, and reduce the risk of separation of the touch panel and the front case body.

In some embodiments, the LDS antenna stand can have a thickness of 0.5 mm.

The technical solution provided by the embodiment of the present disclosure may include the following beneficial effects. By defining the thickness of the LDS antenna stand to 0.5 mm, the flatness of the front case can be improved.

In some embodiments, the touch panel is adhered by a sealant to the front surface of the front case body to which the LDS antenna stand is adhered.

The touch panel can be adhered to the front surface of the front case body to which the LDS antenna stand is adhered by sealant, such that it can reduce the difficulty in the manufacturing process of the electronic device.

In some embodiments, the sealant is a mouth-shaped sealant.

By adhering the touch panel to the front surface of the front case body to which the LDS antenna stand is adhered by the mouth-shaped sealant, the adhesion between the touch panel and the front case body to which the LDS antenna stand is adhered can be improved.

In some embodiments, the main board is fixedly disposed on the back surface of the front case body by screws.

By fixing the main board on the back surface of the front case body by screws, it can reduce the difficulty in manufacturing the electronic device.

In some embodiments, the electronic device further includes: a battery case;

the battery case is detachably snap-fitted with the front case body, an inner wall of the battery case and the back surface of the front case body form an accommodating cavity, and the main board is disposed in the accommodating cavity.

The technical solution provided by the embodiment of the present disclosure may include the following beneficial effects. By placing the main board in the accommodating cavity, the main board can be protected to achieve dustproof, ash-proof and aesthetic appearance.

In some embodiments, the battery case is a three-section battery case.

By using a three-section battery case as the battery case of the electronic device, it is no longer necessary to provide a main antenna for the electronic device, which can reduce the cost of the electronic device.

In some embodiments, both of an upper section of the battery case and a lower section of the battery case are main antennas of the electronic device.

By setting the upper and lower sections of the battery case as the main antennas of the electronic device, the antenna performance of the electronic device can be improved and exhibit an excellent coverage.

It should be understood that both the foregoing general description and the following detailed description are exemplary and explanatory only and are not restrictive of the disclosure.

BRIEF DESCRIPTION OF THE DRAWINGS

To describe the technical solutions in the examples of the present disclosure more clearly, the following briefly introduces the accompanying drawings required for describing the examples. As such, the accompanying drawings in the following description merely show some examples of the present disclosure, and a person of ordinary skill in the art can still derive other drawings from these accompanying drawings without creative efforts, wherein.

Figure 1A:
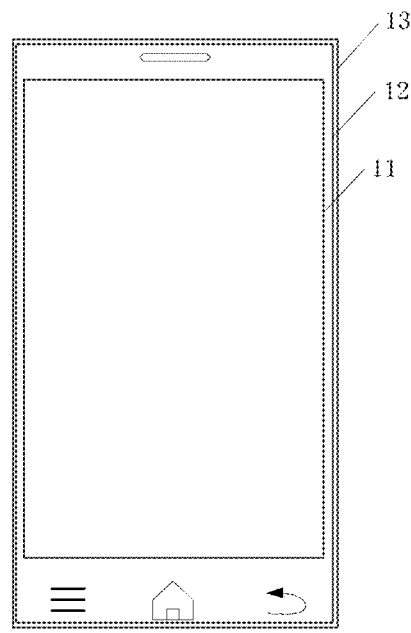
FIG. 1A shows a front view of a smart device.

Various aspects of the present disclosure have been shown by the above-described drawings, which will be described in more detail below. The drawings and the description are not intended to limit the scope of the present disclosure in any way, but explain the concept of the present disclosure to a person skilled in the art with respect to specific aspects.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element is referred to as being "connected" or extending "to" another element, such an element can be directly over or extend directly over the other element or intervening elements can also be present. In contrast, when an element is referred to as being "directly connected" or extending "directly to" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "horizontal" or "horizontal" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In particular the following reference numerals refer to the associated recited components, but can also refer to equivalent structures thereof, wherein: 11=touch panel; 12=front case body; 13=battery case; 14=upper section 15=middle section; 16=lower section; 17=laser direct structuring antenna stand; 18=feeding point of the laser direct structuring antenna stand; 19=through hole; and 20=radiation patch.

The inventor of the present disclosure has recognized that, the smart device manufacturer will often adhere a flexible printed circuit (FPC) board antenna to a front case body of the smart device utilizing a double-sided tape, wherein the flexible printed circuit board antenna can then be utilized to serve as an auxiliary antenna of the smart device which is an extension and supplement of the main antenna and thus improve the performance of the smart device. However, due to the poor structural strength of these flexible printed circuit board antenna, and the weak adhesion of the flexible printed circuit board antenna and the front case body, when a touch panel (TP) is adhered to the front surface of the front case body to which the flexible printed circuit board antenna is adhered is reworked, the flexible printed circuit board antenna tends to be damaged upon removal of the touch panel. As a result, the flexible printed circuit board antenna and the front case can be broken and separated, which causes an associated increase in the cost and difficulty of rework of the touch panel.

Figure 1B:
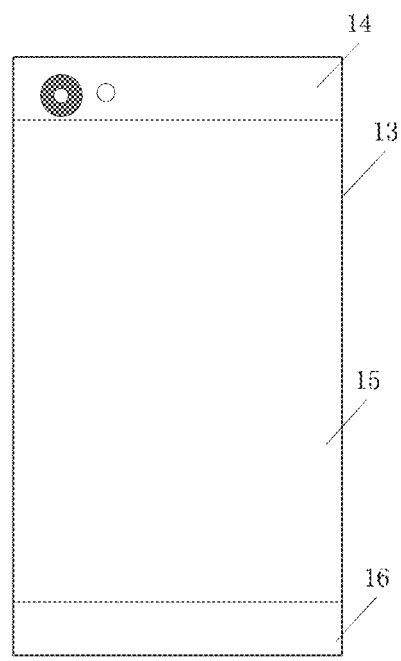
FIG. 1B shows a rear view of a smart device.

FIG. 1A shows a front view of a smart device. FIG. 1B shows a rear view of a smart device. Various embodiments of the present disclosure can be implemented as part of the smart device, or on the smart device.

As shown in FIG. 1A and FIG. 1B, the smart device can include: a touch panel 11, a front case body 12, a main board (not shown), and a battery case 13. The touch panel 11 is adhered to the front surface of the front case body 12; and the battery case 13 and the front case body 12 are detachably snap-fitted with each other. The inner wall of the battery case 13 and the back surface of the front case body 12 form an accommodating cavity, wherein the main board is disposed in the accommodating cavity and fixedly disposed on the back surface of the front case body 12. In some embodiments, the smart device can further include other components, which is not limited thereto. The front surface of the front case body 12 refers to the surface of the front case body 12 facing the outside of the smart device, and the back surface of the front case body 12 refers to the surface of the front case body 12 facing the inside of the smart device.

The main board is configured to implement functions of the smart device, such as communication functions, data processing functions, and the like.

The battery case 13 illustrated here is a three-section battery case 13. That is, the battery case 13 is divided into three sections, which are an upper section 14, a middle section 15, and a lower section 16, respectively. The upper section 14 and the lower section 16 serve as the main antennas of the smart device, and the middle section 15 functions to isolate the upper section 14 and the lower section 16 to avoid interference.

To improve the performance of the smart device with the three-section battery case 13, the smart device manufacturer can adhere a flexible printed circuit board antenna to the front case of the smart device by a double-sided tape, and the flexible printed circuit board antenna can serve as an auxiliary antenna of the smart device which is an extension and supplement of the main antenna, which can then be utilized so as to improve the performance of the smart device.

Specifically, the front case body 12 can be provided with a through hole matching the shape of the feeding point of the flexible printed circuit board antenna, and the main board is provided with an antenna elastic piece connected to the feeding point of the flexible printed circuit board antenna.

The flexible printed circuit board antenna is adhered to the front surface of the front case body 12 by a double-sided tape, and the touch panel 11 is adhered by a sealant to the front surface of the front case body 12 to which the flexible printed circuit board antenna is adhered.

The feeding point of the flexible printed circuit board is then configured in a shape such that the antenna extends through the through hole to the back surface of the front case, and is in contact with the antenna elastic piece provided on the main board that is fixedly disposed on the back surface of the front case body 12, in order for the feeding point to be electrically connected to the antenna loop on the main board to realize the antenna function.

Since the flexible printed circuit board antenna is adhered to the front surface of the front case body 12 by a double-sided tape, this adhering method makes the adhesion between the flexible printed circuit board antenna and the front case body 12 very weak. Also, due to the poor structural strength of the flexible printed circuit board antenna, when the touch panel 11 is reworked, and when for example, if the touch panel 11 is not aligned, the touch panel 11 has to be reinstalled, or if the touch panel 11 is damaged, and the touch panel 11 otherwise has to be replaced, the flexible printed circuit board antenna tends to be damaged during removal of the touch panel having the sealant. As a result, the flexible printed circuit board antenna and the front case body 12 can be broken and separated, which can result in an increased cost and difficulty of rework of the touch panel 11.

In addition, sealant is often adhered to the front surface of the front case body 12 via the flexible printed circuit board antenna. Due to the weak adhesion between the flexible printed circuit board antenna and the front case body 12, effective adhering area between the sealant and the front case body 12 is not sufficiently large. As a result, the adhesive strength between the sealant and the front case body 12 is weak, and the touch panel 11 and the front case body 12 can come off the sealant and be separated.

Various embodiments of the present disclosure provide a front case of an electronic device in which the flexible printed circuit board antenna is replaced with a laser-direct-structuring antenna stand to function as the auxiliary antenna of the electronic device, the laser-direct-structuring antenna stand having a high structural strength, wherein the laser direct structuring antenna stand is adhered to the front surface of the front case body utilizing an adhesive. This alternative arrangement and structure can enhance the adhesion between the laser direct structuring antenna stand and the front case body, and further improve the adhesive strength between the touch panel and the front case body. This alternative structure and connection method can reduce the difficulty and the cost of the rework of the touch panel, and reduce the risk of separation between the touch panel and the front case body.

Although this disclosure discusses the use of the laser direct structuring antenna as it applies to smart devices or terminals, the front case of the electronic device provided by the present disclosure can be applied to any electronic device having an auxiliary antenna on the front case body, wherein the devices discussed herein are discussed by way of example only for the purposes of illustrating aspects of the present disclosure. The electronic device as contemplated herein can also include a three-section battery case or other battery case.

The technical solutions of the present disclosure will be described in detail below with specific aspects. The following specific aspects can be combined with one another, and while the same or similar concepts or processes may not or may not be described in some embodiments they may nevertheless be included in any number of combination of features and may thus be In some embodiments utilized in conjunction with features of any other alternative embodiment as will be appreciated as suitable in certain instances by those having skill in the art.

Figure 2:
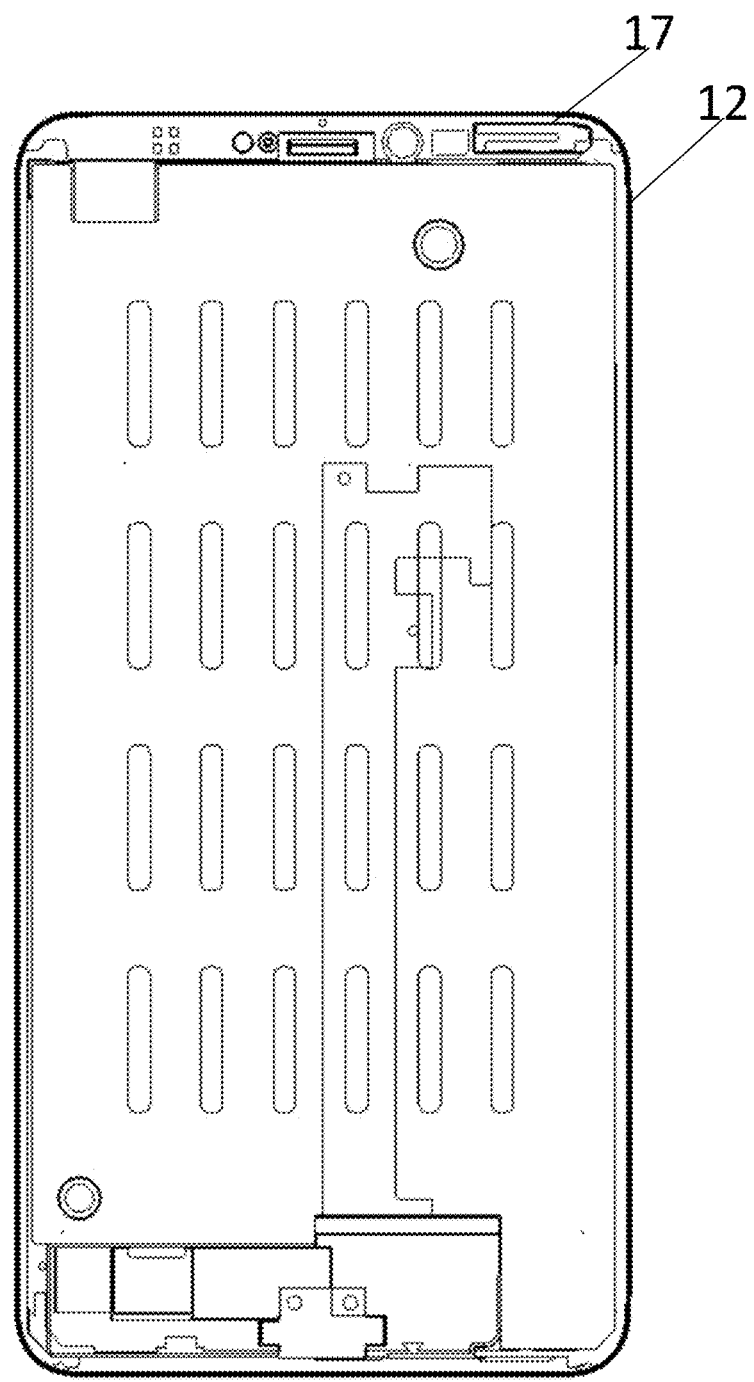
FIG. 2 illustrates a front view of a front case of an electronic device in accordance with various aspects of the present disclosure.
Figure 3:
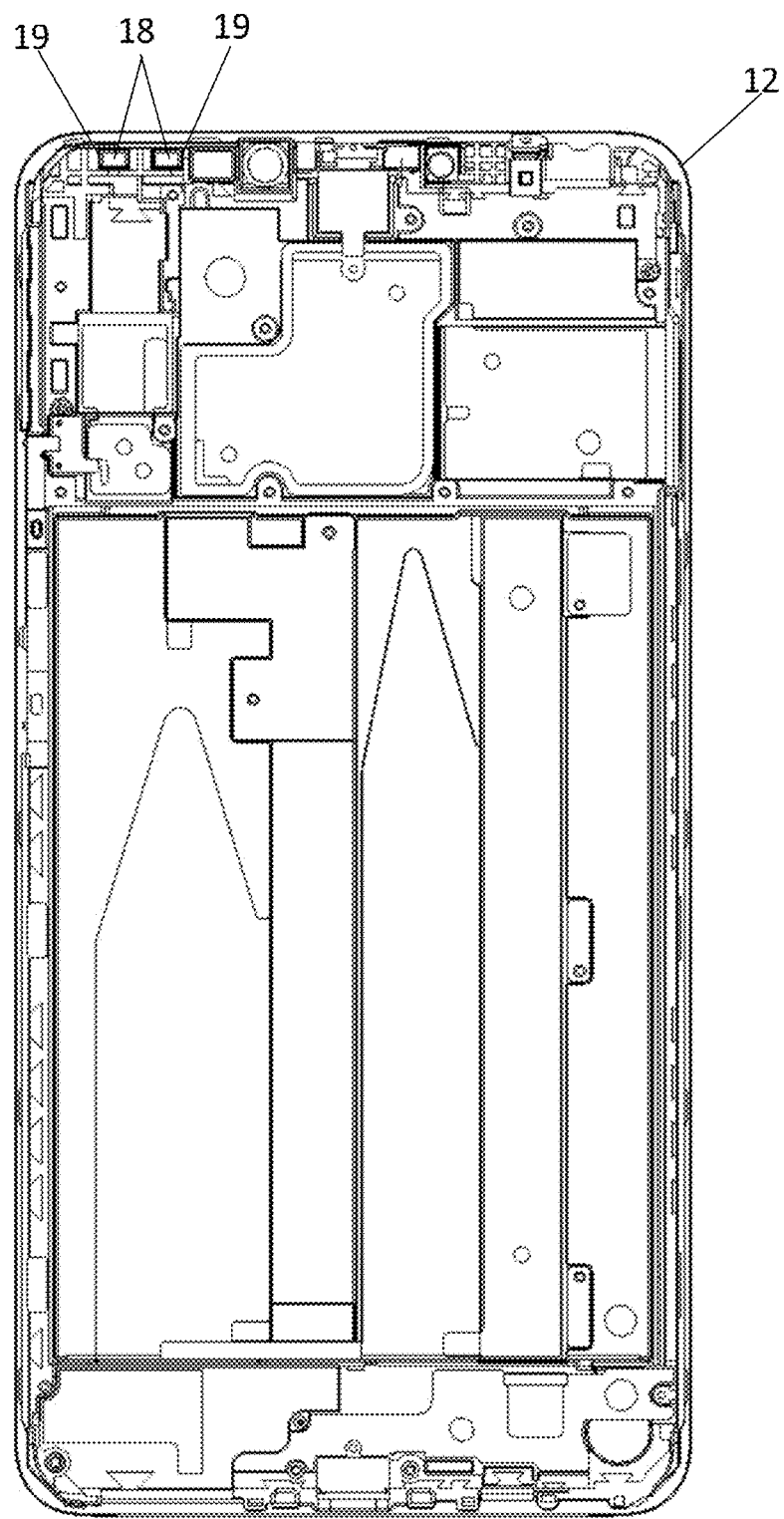
FIG. 3 illustrates a rear view of a front case of an electronic device in accordance with various aspects of the present disclosure.

FIG. 2 illustrates a front view of a front case of an electronic device according to an exemplary aspect. in contrast FIG. 3 illustrates a rear view of a front case of an electronic device according to an exemplary aspect. As shown in FIG. 2 to FIG. 3, the front case of the electronic device includes a front case body 12, and a laser direct structuring antenna stand 17 being configured to function as an auxiliary antenna of the electronic device.

The front case body 12 is provided with a through hole 19 matching the shape of the feeding point 18 of the laser direct structuring antenna stand 17.

The laser direct structuring antenna stand 17 is adhered to the front surface of the front case body 12 by dispensing an adhesive, and the feeding point 18 of the laser direct structuring antenna stand 17 such that it extends through the through hole 19 and to the back surface of the front case body 12.

Figure 4:
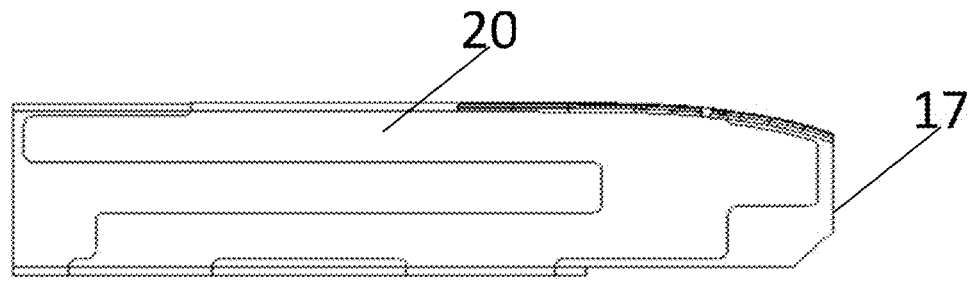
FIG. 4 illustrates a front view of an laser direct structuring antenna stand in accordance with various aspects of the present disclosure.

FIG. 4 illustrates a front zoomed in view of the laser direct structuring antenna stand of FIG. 2 and FIG. 3.

Figure 5:
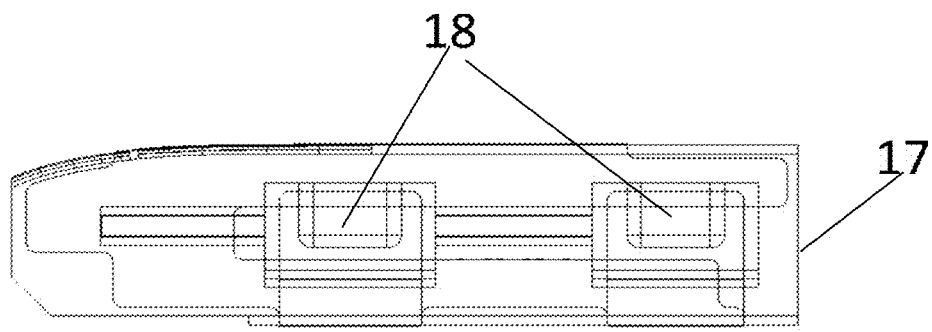
FIG. 5 illustrates a rear view of an laser direct structuring antenna stand in accordance with various aspects of the present disclosure.

FIG. 5 illustrates a rear zoomed in view of an laser direct structuring antenna stand as illustrated in FIGS. 2-4.

Figure 6:
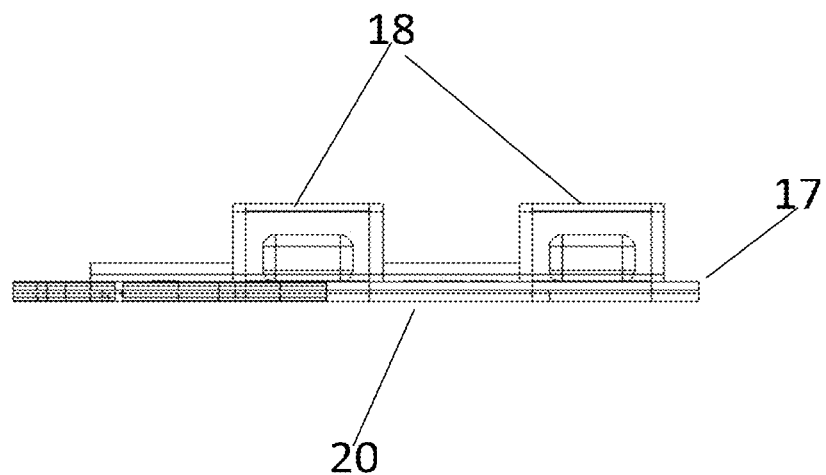
FIG. 6 illustrates a side view of an laser direct structuring antenna stand in accordance with various aspects of the present disclosure.

FIG. 6 illustrates a zoomed side view of the laser direct structuring antenna stand of FIGS. 2-5 being illustrative of various aspects of the present disclosure.

As shown in FIGS. 4-6, the laser direct structuring antenna stand 17 can be an laser direct structuring antenna stand 17 formed by performing a laser direct structuring process on an injection molded holder. The present disclosure does not limit the thickness of the laser direct structuring antenna stand 17, and for example, the thickness of the laser direct structuring antenna stand 17 can be provided having a thickness between 0.5 mm, 0.8 mm, or the like. In some instances, such as when the thickness of the above laser direct structuring antenna stand 17 is 0.5 mm, the overall thickness of the front case can be reduced.

In some embodiments, a radiation patch 20 can be provided on the laser direct structuring antenna stand 17 wherein the radiation patch 20 can be provided having a zigzag shape, a U shape, or the like.

FIGS. 2-6 show a radiation patch 20 which is exemplified in a U shape; however, this particular shape is not intended to be limiting.

In some embodiments, the number of the feeding points 18 of the laser direct structuring antenna stand 17 can be specifically set according to the requirements of the electronic device.

As an example, FIGS. 2-6 show an laser direct structuring antenna stand 17 can be provided having two feeding points, however more can be provided as necessary.

Since the adhesive force of the dispensing adhesive utilized to bond the laser direct structuring antenna stand to the front case body is greater than the adhesive force of the double-sided tape, the adhesive force between the laser direct structuring antenna stand 17 and the front case body 12 can be reinforced through adhering the laser direct structuring antenna stand 17 to the front surface of the front case body 12 by utilizing dispensing adhesive. Thus, the adhesive force between the laser direct structuring antenna stand 17 and the front case body 12 can be greater than the adhesive force between the flexible printed circuit board antenna and the front case body 12. Moreover, since the structural strength of the laser direct structuring antenna stand 17 is higher than that of the flexible printed circuit board antenna, the overall strength of the front case can be improved. In addition, since the laser direct structuring antenna stand 17 can be conveniently installed, the assembly cost of the front case can be reduced, and the assembly efficiency of the front case can be improved.

When the front case described above is applied to the electronic device, the touch panel 11 can be safely separated from the front case body 12 when the touch panel 11 is reworked, and the laser direct structuring antenna stand 17 will not be broken and thus the separation of the laser direct structuring antenna stand 17 and the front case will not happen due to the removal of the touch panel 11. Thus, this arrangement involving the laser direct structuring antennal stand and dispensing adhesive securement means can reduce the cost and difficulty of the rework of the touch panel 11.

In addition, the sealant for adhering the touch panel 11 and the front case body 12 is adhered to the front surface of the front case body 12 via the laser direct structuring antenna stand 17, and due to the strong adhesion between the laser direct structuring antenna stand 17 and the front case body 12, the area of the laser direct structuring antenna stand 17 on the front surface of the front case body 12 is significantly larger effective adhering area. Therefore, when the front case is applied to the electronic device, the effective adhering area of the sealant and the front case body 12 can be enlarged, thereby improving the adhering strength between the sealant and the front case body 12, and reducing the risk that the touch panel 11 and the front case body 12 becoming separated.

In the front case of the electronic device provided by the present disclosure, the flexible printed circuit board antenna can be replaced with a laser direct structuring antenna stand as the auxiliary antenna of the electronic device having a high structural strength, and the laser direct structuring antenna stand is adhered to the front surface of the front case body by dispensing glue or adhesive, thereby it can enhance the adhesion between the laser direct structuring antenna stand and the front case body. When the front case is applied on the electronic device, it can improve the adhesive strength between the touch panel and the front case body, reduce the difficulty and the cost of the rework of the touch panel, and reduce the risk of separation of the touch panel and the front case body.

Taking the smart device shown in FIG. 1 as an example, the present disclosure further provides an electronic device, which includes a touch panel 11 and a main board (not shown) in addition to the front case of the electronic device shown in FIG. 2 to FIG. 3.

The front case is such embodiments can include: a front case body 12, and a laser direct structuring laser direct structuring antenna stand 17 as an auxiliary antenna of the electronic device. The front case body 12 in this embodiment can be provided thereon a through hole 19 matching the shape of the feeding point 18 of the laser direct structuring antenna stand 17.

The laser direct structuring antenna stand 17 can then be adhered to the front surface of the front case body 12 by dispensing glue or adhesive, and the touch panel 11 can then be adhered to the front surface of the front case body 12 to which the laser direct structuring antenna stand 17 is also adhered.

For example, the touch panel 11 can be adhered by a sealant to the same front surface of the front case body 12 to which the laser direct structuring antenna stand 17 is adhered. The sealant mentioned here can be, for example, a crescent-shaped sealant or a farmland-shaped sealant. Alternatively, the touch panel 11 described above can be adhered by other means as will be appreciated by those having skill in the art to the front surface of the front case body 12 to which the laser direct structuring antenna stand 17 is adhered.

The main board can then be provided with an antenna elastic portion which can be connected to the feeding point 18 of the laser direct structuring antenna stand 17. The main board can then be fixedly disposed on the back surface of the front case body 12, and the feeding point 18 of the laser direct structuring antenna stand 17 such that the main board extends through the through hole 19 to the back surface of the front case body 12, so as to provide contact with the antenna elastic portion disposed on the main board. For example, the main board can be fixedly disposed on the back surface of the front case body 12 by means of screws or other fasteners, or the main board can alternatively be fixedly disposed on the back surface of the front case body 12 by welding or the like.

In some aspects, the above electronic device can further include: a battery case 13. In such embodiments, the battery case 13 can detachably attached to the front case body 12, for example, the battery case 13 can be snap fitted or interference fitted with the front case body 12. In such embodiments, the inner wall of the battery case 13 and the back surface of the front case body 12 can be shaped in a manner so as to form an accommodating cavity, wherein the main board can then be disposed within the accommodating cavity.

Alternatively, the battery case 13 can be a three-section battery case 13, or other types of battery cases 13 as will be appreciated by those having skill in the art. When the battery case 13 is provided as a three-section battery case 13, the upper section 14 of the battery case 13 and the lower section 16 of the battery case 13 can function as the main antennas of the electronic device.

An assembling process of the electronic device is also contemplated herein which can be illustrated by an exemplary process in which the touch panel 11 is adhered by a crescent-shaped sealant to the front surface of the front case body 12 to which the laser direct structuring antenna stand 17 is adhered, and wherein the main board is fixedly disposed on the back surface of the front case body 12 by one or more fastening means, such as screws.

The laser direct structuring antenna stand 17 can then be adhered to the front surface of the front case body 12 by means of a dispensing glue or adhesive.

At this time, the feeding point 18 of the laser direct structuring antenna stand 17 can be extended through a corresponding hole 19 provided through the front case body 12 and extends to the back surface of the front case body 12.

The crescent-shaped sealant can then be adhered to the front surface of the front case body 12 to which the laser direct structuring antenna stand 17 is adhered.

The touch panel 11 can then be adhered to the crescent-shaped sealant so as to adhere the touch panel 11 to the front surface of the front case body 12 to which the laser direct structuring antenna stand 17 is also adhered.

The main board can then be fixedly disposed on a back surface of the front case body 12 by means of the one or more fastening means, i.e., screws.

At this time, the antenna elastic piece on the main board and the feeding point 18 of the laser direct structuring antenna stand 17 can be placed in contact so as to be electrically connected to the antenna loop on the main board and thus provide the antenna function.

The battery can then be fixedly disposed on the back surface of the front case body 12. In some such embodiments, the battery case 13 can then be affixed to the front case body, for example the battery case 13 can be snap-fitted or interference fitted to the front case body 12 such that the main board and the battery are disposed in the accommodating cavity formed by the inner wall of the battery case 13 and the back surface of the front case body 12.

Since the adhesive force of the dispensing glue or adhesive is greater than the adhesive force of the double-sided tape, the adhesive force between the laser direct structuring antenna stand 17 and the front case body 12 can be reinforced through adhering the laser direct structuring antenna stand 17 to the front surface of the front case body 12 by dispensing glue or adhesive. Thus, the adhesive force between the laser direct structuring antenna stand 17 and the front case body 12 can be greater than the adhesive force between the flexible printed circuit board antenna and the front case body 12 as provided in a conventional manner. Moreover, since the structural strength of the laser direct structuring antenna stand 17 is higher than that of the flexible printed circuit board antenna, the overall strength of the front case can be improved. In addition, since the laser direct structuring antenna stand 17 can be conveniently installed, the assembly cost of the front case can be reduced, and the assembly efficiency of the front case can be improved.

When the front case described above is applied to the electronic device, the touch panel 11 can be safely separated from the front case body 12 when the touch panel 11 is reworked, and the laser direct structuring antenna stand 17 will not be broken and thus the separation of the laser direct structuring antenna stand 17 and the front case will not happen due to the removal of the touch panel 11. Thus, it can reduce the cost and difficulty of the rework of the touch panel 11.

In addition, the sealant for adhering the touch panel 11 and the front case body 12 is adhered to the front surface of the front case body 12 via the laser direct structuring antenna stand 17, and due to the strong adhesion between the laser direct structuring antenna stand 17 and the front case body 12, as well as the increased area of the laser direct structuring antenna stand 17 on the front surface of the front case body 12 provides a larger effective adhering area. Therefore, when the front case is applied to the electronic device, the effective adhering area of the sealant and the front case body 12 can be enlarged, thereby improving the adhering strength between the sealant and the front case body 12, and reducing the risk that the touch panel 11 and the front case body 12 can break the seal of the sealant and thus become separated.

In the electronic device provided by the present disclosure, the flexible printed circuit board antenna is replaced with a laser direct structuring antenna stand having a high structural strength as the auxiliary antenna of the electronic device, and the laser direct structuring antenna stand is adhered to the front surface of the front case body by dispensing glue or adhesive, thereby it can enhance the adhesion between the laser direct structuring antenna stand and the front case body, further improve the adhesive strength between the touch panel and the front case body, reduce the difficulty and the cost of the rework of the touch panel, and reduce the risk of separation of the touch panel and the front case body.

Figure 7:
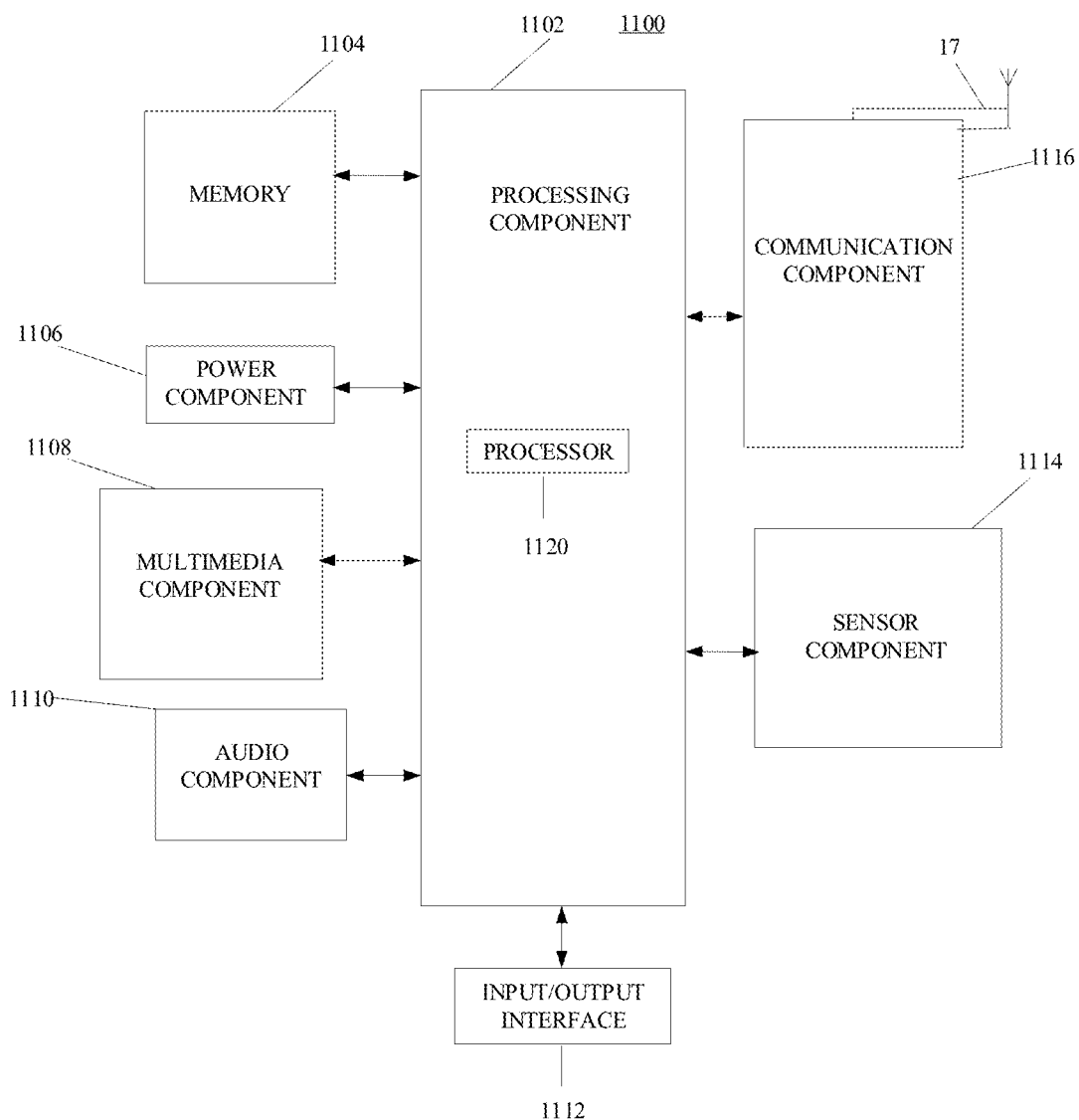
FIG. 7 illustrates a block diagram of an electronic device utilizing a front case and laser direct structuring antenna as contemplated herein in accordance with various aspects of the present disclosure.

FIG. 7 illustrates a block diagram of an electronic device 1100 according to an exemplary aspect. For example, the electronic device 1100 can be a mobile phone, a computer, a digital broadcast smart device, a messaging device, a gaming console, a tablet, a medical device, exercise equipment, a personal digital assistant, and the like.

Referring to FIG. 7, the electronic device 1100 can include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 can be configured to control overall operations of the electronic device 1100, such as the operations associated with display, telephone calls, data communications, camera operations, and recording operations. The processing component 1102 can include one or more processors 1120 configured to execute instructions stored on the memory. Moreover, the processing component 1102 can include one or more modules configured to facilitate the interaction between the processing component 1102 and other components. For instance, the processing component 1102 can include a multimedia module which can facilitate the interaction between the multimedia component 1108 and the processing component 1102.

The various device components, blocks, or portions may have modular configurations, or are composed of discrete components, but nonetheless may be referred to as "modules" in general. In other words, the "modules" referred to herein may or may not be in modular forms.

The memory 1104 can then be configured to store various types of data to support the operation of the electronic device 1100. Examples of such data include instructions for any applications or methods operated on the electronic device 1100, contact data, phonebook data, messages, pictures, video, etc. The memory 1104 can be implemented using any type of volatile or non-volatile memory devices, or a combination thereof, such as by means of a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and/or a magnetic or optical disk.

The power component 1106 can be configured so as to provide power to various components of the electronic device 1100. The power component 1106 can include a power management system, one or more power sources, and any other additional components which may be necessary or otherwise associated with the generation, management, and distribution of power in the electronic device 1100.

The multimedia component 1108 can in some instances include a touch display which can be utilized for providing an input and output interface between the electronic device 1100 and the user. In some aspects, the touch display can include a liquid crystal display (LCD) and a touch panel (TP). If the screen includes the touch panel, the screen can be implemented as a touch screen to receive input signals from the user. The touch panel in some such instances can then include one or more touch sensors to detect touches, swipes, and gestures on the touch panel. The touch sensors can in some instances not only sense a boundary of a touch or swipe action, but also sense a period of time and a pressure associated with the touch or swipe action. In some aspects, the multimedia component 1108 can also include a front camera and/or a rear camera. In some such instances, the front camera and the rear camera can be configured so as to receive information from one or more external multimedia sources while the electronic device 1100 is in an operation mode, such as a photographing mode or a video mode. Each of the front camera and the rear camera can be provided as a fixed optical lens system or alternatively be provided having focus and optical zoom capability.

To provide for interaction with a user, implementations of the subject matter described in this specification can be implemented with various types of display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), plasma, other flexible configuration, or any other monitor for displaying information to the user and a keyboard, a pointing device, e.g., a mouse, trackball, etc., or a touch screen, touch pad, etc., by which the user can provide input to the computer.

The audio component 1110 can be configured to output and/or input various audio signals. For example, the audio component 1110 can include a microphone ("MIC") which can then be configured to receive an external audio signal when the electronic device 1100 is in an operation mode, such as a call mode, a recording mode, and a voice recognition mode. The received audio signals can be further stored in the memory 1104 or transmitted via the communication component 1116. In some aspects, the audio component 1110 can further include a speaker to output audio signals.

The I/O interface 1112 can provide an interface between the processing component 1102 and peripheral interface modules, such as a keyboard, a click wheel, buttons, and the like. The buttons can include, but are not limited to, a home button, a volume button, a starting button, and a locking button.

The sensor component 1114 can include one or more sensors configured to provide status assessments of various aspects of the electronic device 1100. For instance, the sensor component 1114 can be configured so as to detect an open/closed status of the electronic device 1100, relative positioning of components, e.g., the display and the keypad, a change in position of the electronic device 1100 or a component of the electronic device 1100, a presence or absence of user contact with the electronic device 1100, an orientation or an acceleration/deceleration of the electronic device 1100, and a change in temperature of the electronic device 1100. The sensor component 1114 can include a proximity sensor configured to detect the presence of nearby objects without any physical contact. The sensor component 1114 can also include a light sensor, such as a CMOS or CCD image sensor, for use in imaging applications. In some aspects, the sensor component 1114 can also include an accelerometer sensor, a gyroscope sensor, a magnetic sensor, a pressure sensor, or a temperature sensor.

The communication component 1116 can then be configured to facilitate communication, wired or wirelessly, between the electronic device 1100 and other devices. The electronic device 1100 can access a wireless network based on a communication standard, such as Wi-Fi, 2G, or 3G, or a combination thereof. In one exemplary aspect, the communication component 1116 can be configured so as to receive a broadcast signal or broadcast associated information from an external broadcast management system via a broadcast channel. In one exemplary aspect, the communication component 1116 further includes a near field communication (NFC) module which can be configured to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies as will be recognized by those having skill in the art.

In some exemplary aspects, the electronic device 1100 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In exemplary aspects, a non-transitory computer-readable storage medium can be provided having computer implemented instructions saved thereon, such as included in the memory 1104, which can then be executable by the processor 1120 in the electronic device 1100. For example, the non-transitory computer-readable storage medium can be a ROM, a RAM, a CD-ROM, a magnetic tape, a floppy disc, an optical data storage device, and the like.

The electronic device 1100 can also include a front case. Specifically, the front case can include a front case body, and a laser direct structuring laser direct structuring antenna stand which is configured to function as an auxiliary antenna of the electronic device.

A through hole matching the shape of the feeding point of the laser direct structuring antenna stand can be provided on or through the front case body.

The laser direct structuring antenna stand can in some instances be adhered to the front surface of the front case body by dispensing glue or adhesive. A feeding point of the laser direct structuring antenna stand can be provided which extends through the through hole to the back surface of the front case body.

In some embodiments, the laser direct structuring antenna can be provided having a thickness of 0.5 mm.

The foregoing has provided a detailed description a front case of an electronic device and an electronic device associated therewith according to some embodiments of the present disclosure. Specific examples are used herein to describe the principles and implementations of some embodiments. The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

Additionally, each of the above optional technical solutions are included for the purposes of illustration of various concepts and form optional examples only, wherein each embodiment as discussed herein can include particular elements when referring to a particular embodiment, however, such combinations of elements are made for exemplary purposes only, wherein each feature or element of the present disclosure can be utilized in any combination as will be deemed appropriate by those having skill in the art.

In addition, those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), step(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or step, etc. is employed, or it is expressly stated that a plurality of devices, or steps, etc. are employed, the device(s), step(s), etc. can be singular, or plural.

Based on various embodiments of the present disclosure, the disclosed apparatuses, devices, and methods can be implemented in other manners. For example, the abovementioned systems are only of illustrative purposes, and other types of systems and devices can be suitable for employing the methods disclosed herein.

Dividing the system or device into different "portions", "regions", "or "components" merely reflect various logical functions according to some embodiments, and actual implementations can have other divisions of "portions," "regions," or "components" realizing similar functions as described above, with or without such divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in one or more devices capable of utilizing the components as described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The order of the various embodiments described above are only for the purpose of illustration, and do not represent preference of embodiments.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted can occur out of the order noted in the figures. For example, two functions or acts shown in succession can in fact be executed concurrently or can sometimes be executed in the reverse order, depending upon the functionality/acts involved.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A front case of an electronic device, comprising:
a front case body; and
a laser direct structuring antenna stand affixed to the front case body, the laser direct structuring antenna stand configured to serve as an auxiliary antenna of the electronic device, wherein:
the front case body is provided, adjacent to an upper edge of the front case body, with a through hole matching a shape of a feeding point of the laser direct structuring antenna stand; and
the laser direct structuring antenna stand is adhered to a front surface of the front case body by dispensing an adhesive, and the feeding point of the laser direct structuring antenna stand extends through the through hole to a back surface of the front case body.

2. The front case according to claim 1, wherein the laser direct structuring antenna stand has a thickness of 0.5 mm.

3. An electronic device comprising:
a touch panel;
a front case, the front case further comprising:
a front case body; and
a laser direct structuring laser direct structuring antenna stand that serves as an auxiliary antenna of the electronic device;
a through hole provided on the front case body, the through hole matching a shape of a feeding point of the laser direct structuring antenna stand; and wherein:
the laser direct structuring antenna stand is adhered to a front surface of the front case body by dispensing adhesive, and the touch panel is adhered on the front surface of the front case body to which the laser direct structuring antenna stand is adhered;
the main board is provided with an antenna elastic piece connected to the feeding point of the laser direct structuring antenna stand, the main board is fixedly disposed on a back surface of the front case body, and the feeding point of the laser direct structuring antenna stand extends through the through hole to the back surface of the front case body to be in contact with the antenna elastic piece on the main board.

4. The electronic device of claim 3, wherein the laser direct structuring antenna stand has a thickness of 0.5 mm.

5. The electronic device according to claim 3, wherein the touch panel is adhered by a sealant to the front surface of the front case body to which the laser direct structuring antenna stand is adhered.

6. The electronic device according to claim 5, wherein the sealant is a crescent-shaped sealant.

7. The electronic device according to claim 3, wherein the main board is fixedly disposed on the back surface of the front case body by one or more screws.

8. The electronic device according to claim 3, wherein the electronic device further comprises a battery case, wherein the battery case is detachably affixed to the front case body, an inner wall of the battery case, and wherein the back surface of the front case body form an associated cavity, and wherein the main board is disposed within in the associated cavity.

9. The electronic device according to claim 8, wherein the battery case formed having three sections.

10. The electronic device according to claim 9, wherein both of an upper section of the battery case and a lower section of the battery case are configured to act as main antennas of the electronic device.

11. An assembling process of an electronic device, the process comprising:
providing a touch panel;
providing a front case body having a front surface;
providing a laser direct structuring antenna stand having a feeding point;
providing a main board;
adhering the laser direct structuring antenna stand to the front surface of the front case body
adhering the touch panel to the front surface of the front case body utilizing a crescent-shaped sealant; and
affixing the main board to a back surface of the front case body utilizing one or more fastening means.

12. The assembling process of an electronic device of claim 11, wherein the laser direct structuring antenna stand is adhered to the front surface of the front case body by means of a dispensing glue.

13. The assembling process of an electronic device of claim 11, further comprising:
extending the feeding point of the laser direct structuring antenna stand through a corresponding hole provided through the front case body, wherein the corresponding hole extends to the back surface of the front case body.

14. The assembling process of an electronic device of claim 11, wherein the crescent-shaped sealant is adhered to a corresponding portion of the front surface of the front case body to which the laser direct structuring antenna stand is also adhered.

15. The assembling process of an electronic device of claim 11, wherein the main board is fixedly disposed on a back surface of the front case body by means of one or more fastening means.

16. The assembling process of an electronic device of claim 15, wherein the one or more fastening means is a plurality of screws.

17. The assembling process of an electronic device of claim 15, the process further comprising:
providing an elastic piece on the main board; and
placing the antenna elastic piece of the main board and the feeding point of the laser direct structuring antenna stand so as to contact one another so as to be electrically connected to an antenna loop on the main board and thus provide an antenna function.

18. The assembling process of an electronic device of claim 11, further comprising:
providing a battery; and
affixing the battery to the back surface of the front case body.

19. The assembling process of an electronic device of claim 18, further comprising:
providing a battery case containing the battery; and
affixing the battery case to the front case body.

20. The assembling process of an electronic device of claim 18, wherein the battery case is snap-fitted to the front case body such that the main board and the battery are disposed in the accommodating cavity formed by the inner wall of the battery case and the back surface of the front case body.

* * * * *